Sept. 4, 1934.  H. R. SCHUTZ  1,972,717
METHOD AND APPARATUS FOR MAKING FOOTED GLASSWARE
Filed Oct. 26, 1933  3 Sheets-Sheet 1
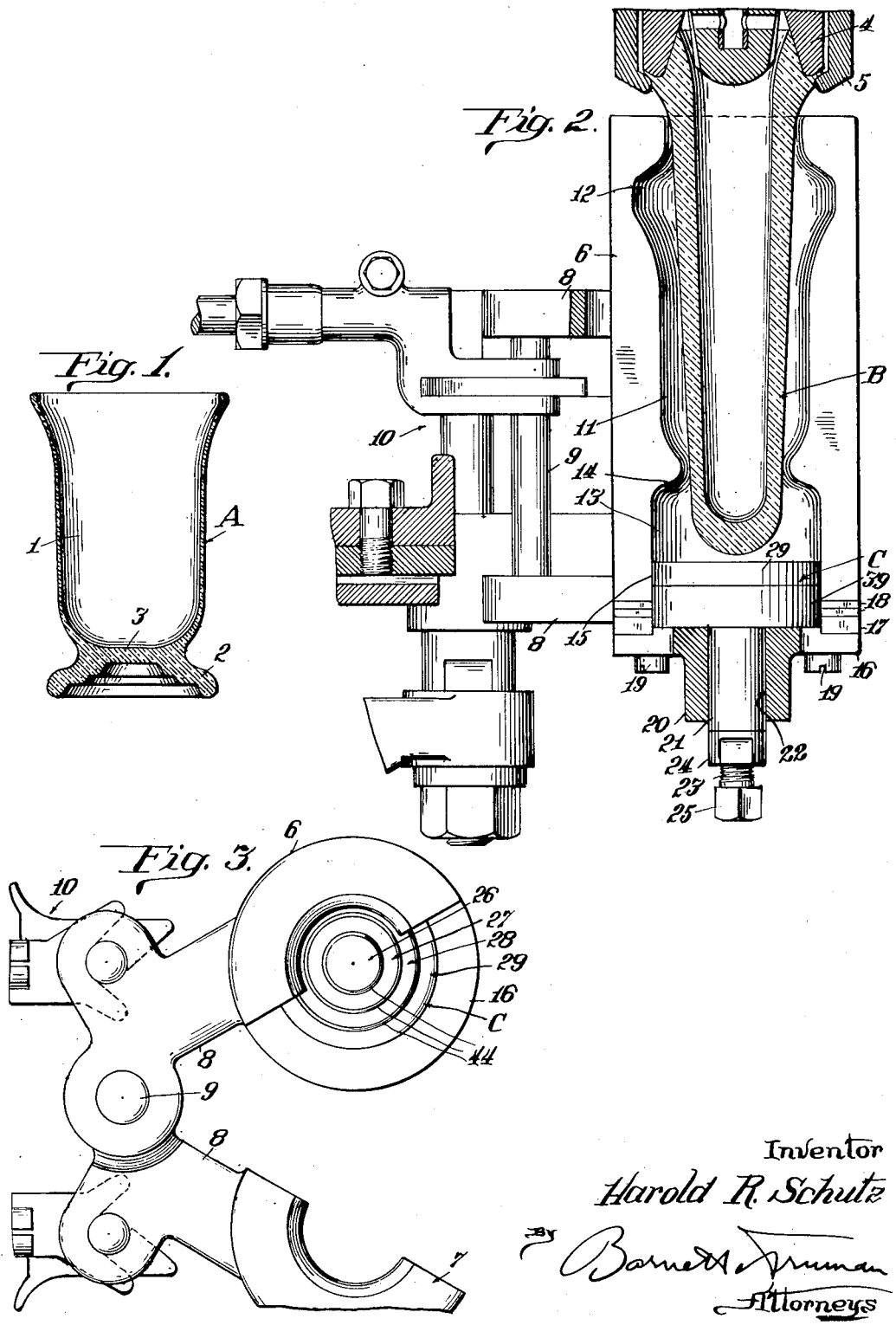

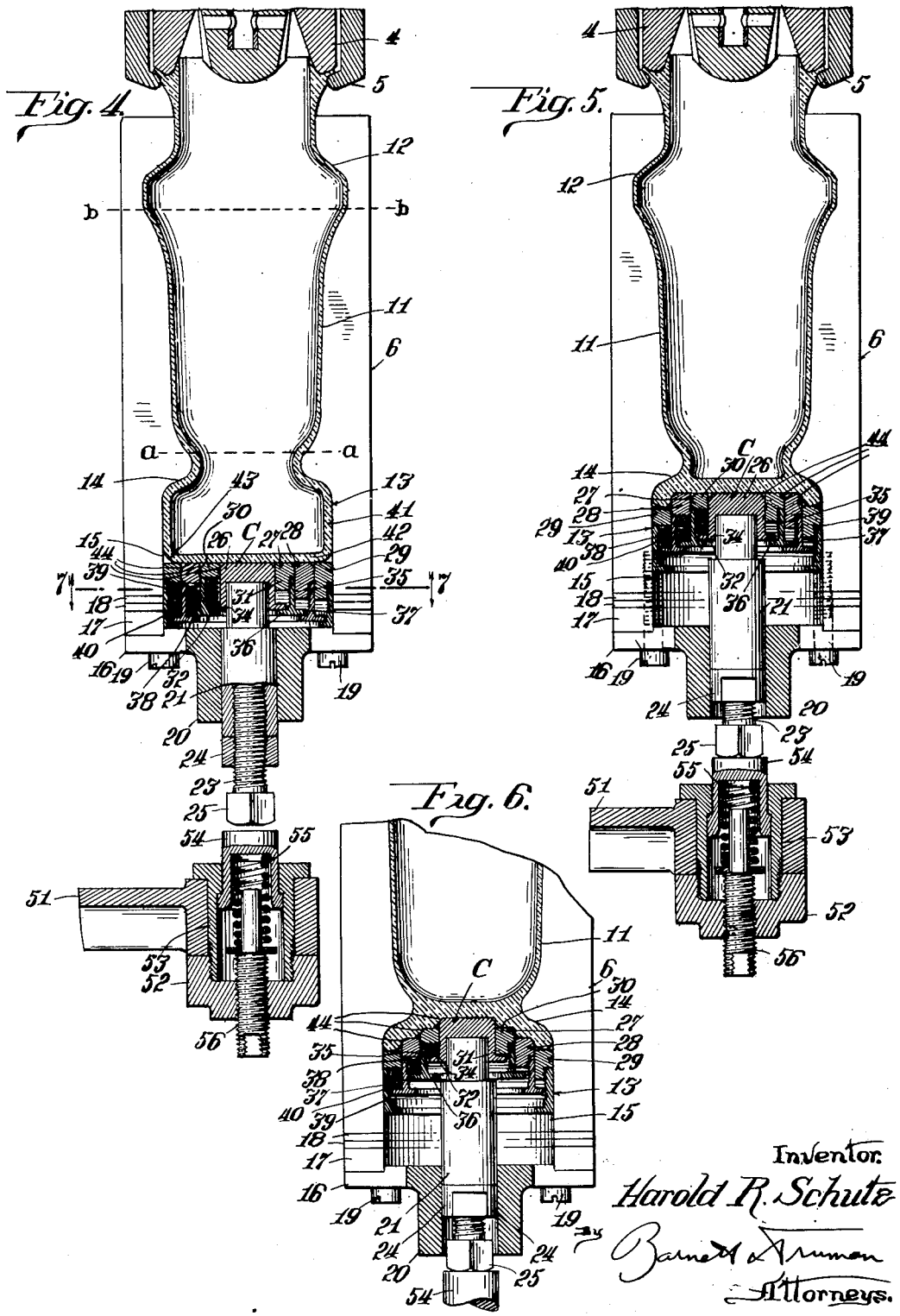

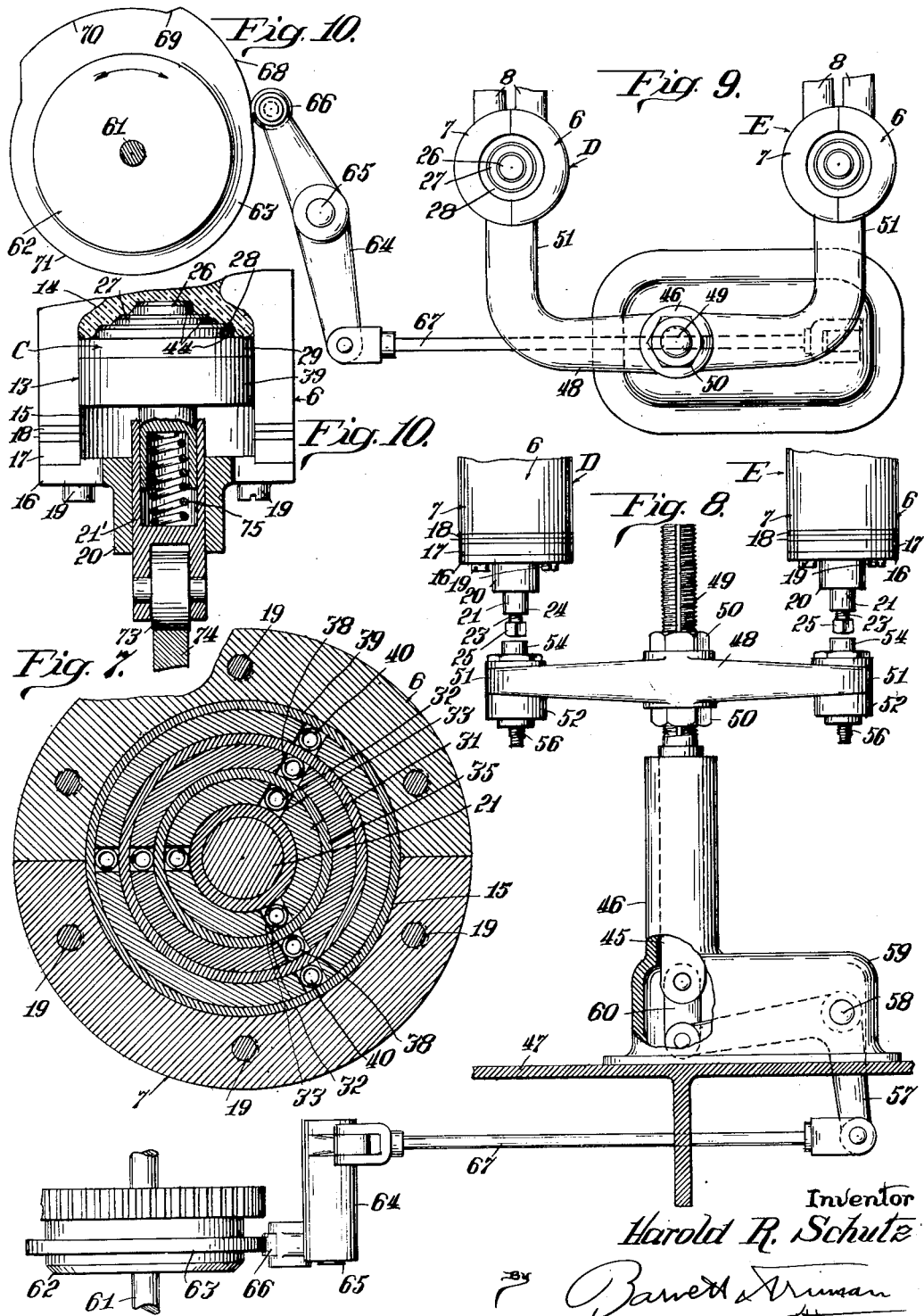

Patented Sept. 4, 1934

1,972,717

UNITED STATES PATENT OFFICE 1,972,717

METHOD AND APPARATUS FOR MAKING FOOTED GLASSWARE

Harold R. Schutz, Ottawa Hills, Ohio, assignor to The Libbey Glass Manufacturing Company, Toledo, Ohio, a corporation of Ohio Application October 26, 1933, Serial No. 695,265

11 Claims. (Cl. 49—8)

This invention relates to a new and improved method and apparatus for making footed glassware, and more particularly to an improved apparatus for making hollow glassware such as tumblers provided with an integral solid foot or supporting member, preferably in the form of a downwardly and outwardly extending substantially annular flange projecting from the bottom of the hollow tumbler.

By means of apparatus of the type herein disclosed and claimed, the entire footed tumbler is formed in one continuous operation embodying simultaneous and cooperative blowing and pressing steps. Briefly described, a blank of molten glass is first blown into an elongated hollow parison, and this blank is then expanded within a mold by applying internal air pressure to the blank so that the upper portion of this blank will be given the predetermined hollow conformation desired in the finished article. The lower portion of the blank, which is to eventually form the bottom and foot or support for the tumbler, is permitted to expand in hollow form beyond the desired final outlines of the tumbler, and then this hollow lower portion is forced upwardly by external pressure applied in opposition to the internal air pressure. As a result the side portions of this lower hollow portion of the glass blank are re-formed as a solid annular supporting foot, while the central portion of this lower portion of the glass blank is elevated to form the bottom of the upper hollow glass receptacle. As a result of the molten condition of the glass, and the opposed pressures applied both inside and outside of the blank, both the inner and outer surfaces of this partially re-formed lower footed portion will be smooth and continuous and there will be no internal evidence within the solid projecting flange or foot of the initial hollow form of the lower portion of the tumbler.

In the improved apparatus herein disclosed and claimed, the means for elevating and compressing the initially hollow lower portion of the glass blank comprises a vertically movable bottom member consisting of a plurality of telescopically assembled relatively movable sections. During the first portion of the re-forming operation, the sections of this bottom member move upwardly as a unit so as to elevate the lower portion of the blank and compress and re-form the side portions thereof. As this re-forming operation is progressively accomplished, the sections of the bottom member are successively halted or retarded, beginning with the outermost section and progressing successively inwardly, the inner section continuing to move upwardly to further elevate the central portion of the blank and to give the desired hollow or concave form to the foot portion, and to form the bottom for the upper hollow portion of the tumbler.

The principal object of this invention is to provide an improved apparatus for forming footed glassware, as briefly described hereinabove and disclosed more in detail in the specification which follows.

Another object is to provide an improved apparatus for forming hollow glassware provided with an integral solid foot or support, whereby both blowing and pressing operations are simultaneously applied to the molten glass blank.

Another object is to provide an improved entirely automatic apparatus for forming footed glassware in one continuous operation.

Another object is to provide an improved means for automatically forming the footed support on a hollow glass tumbler.

Another object is to provide an improved means, in an apparatus of this type, for automatically imparting a series of successive or progressive pressing operations to the lower portion of the glass blank.

Another object is to provide an improved process for making footed glass tumblers in which a series of progressively applied pressing operations are applied to the lower portion of the glass blank in opposition to the internally applied air pressure.

Other objects and advantages of this invention will be more apparent from the following detailed description of certain approved forms of apparatus suitable for carrying out the principles of this invention.

In the accompanying drawings:

Fig. 1 is a central vertical section through one of the finished glass tumblers produced by this improved apparatus.

Fig. 2 is a vertical section through a portion of the apparatus, this view also illustrating one of the initial steps in the formation of the tumbler.

Fig. 3 is a plan view showing the mold sections in opened position.

Figs. 4, 5 and 6 are views similar to the right-hand portion of Fig. 2 illustrating successive steps in the formation of the tumbler.

Fig. 7 is an enlarged horizontal section taken substantially on the line 7—7 of Fig. 4.

Fig. 8 is an elevation, partially in section, showing one form of apparatus for automatically imparting controlled vertical movement to the mold plungers.

Fig. 9 is a plan view of the apparatus shown in Fig. 8.

Fig. 10 is a detail vertical section, corresponding to the lower portion of Figs. 2, 4, 5 or 6, showing a modified apparatus for operating the plunger.

Referring first to Fig. 1, the glass tumbler A comprises a main upper hollow receptacle portion 1 which may be made in a variety of sizes and proportions and may be given a wide choice of different curvatures or conformations, and a lower footed supporting portion 2 here shown as an outwardly and downwardly extending solid annular flange extending integrally from the outer edges of the bottom portion 3 of the receptacle 1. It is a glass article of this type that is produced by the improved apparatus hereinafter described.

Referring now to Figs. 2 to 7 inclusive, at 4 is indicated the lower end of the spindle of an automatic glass-blowing machine of well known type. In such a machine, means is usually provided for inverting this spindle (so that the end 4 will point upwardly instead of downwardly), means is also provided for rotating or oscillating the spindle and the glass blank carried thereby about the longitudinal axis of the spindle, and means is provided for blowing air through the spindle into the glass blank to expand the same. In the operation of such a spindle, the spindle is first inverted so that the end 4 points upwardly and a measured mass of molten glass which has been withdrawn from the source of molten glass and partially formed by a suitable gathering mechanism is dropped on to the end 4 of the spindle and clamped in place by the movable jaws indicated at 5. A small opening is punched in the center of this mass of glass by a plunger movable within the spindle, and puffs of air are blown through the spindle into this internal cavity to partially expand the glass blank or parison. The spindle is swung downwardly or inverted so that the glass blank hangs downwardly and is rotated or oscillated about its longitudinal axis, and by blowing air into the glass blank in suitably timed relation to these movements a wide variety of different conformations may be given to the freely hanging glass blank carried by the spindle. These initial processes simulate the corresponding steps performed by the glass blower with his manually operated blow-pipe, and this automatic mechanism is well known in the art and need not be further discussed here. Sufficient to state that this spindle mechanism is so adjusted as to form an elongated glass blank or parison of substantially the shape and proportions indicated at B in Fig. 2.

The confining member for giving form to the glass article includes a paste-lined mold comprising the two similar sections 6 and 7 which are supported by bracket arms 8 pivoted on a vertical pin 9. The entire mold assembly is carried by a supporting and operating mechanism indicated generally at 10 by means of which the mold is moved into and out of position beneath the spindle, and by which the mold sections 6 and 7 are closed about the parison B as shown in Fig. 2, and at a later time opened or separated as shown in Fig. 3 to permit the removal of the finished glass article. All of this mechanism is old and well known in the art, the only specifically new features of this apparatus residing in the construction of the mold sections 6 and 7 and the bottom plunger mechanism therein which is indicated generally at C, and the means for operating this bottom or plunger in properly timed relation to the operations of the glass-blowing machine, all as set forth hereinafter. It might be here noted that, although it is not essential to this invention, these molding and glass forming devices are usually arranged in pairs as indicated at D and E in Figs. 8 and 9. Also a pair of simultaneously operated spindles and glass gathering devices are provided to cooperate with the pair of forming mechanisms D and E. This doubles the capacity of the machine since a single set of operating mechanisms can simultaneously operate both glass-forming devices. Aside from this feature the process carried out in each glass-forming mechanism is entirely independent of the other one of the pair, and the description which follows will in general be limited to one of these two similar mechanisms.

The cavity in the mold (one-half of which is formed in each of the two sections 6 and 7) comprises the main central portion 11 which gives exterior form to the finished receptacle, an upper portion 12 which confines the upper inwardly converging portion of the glass blank which is afterwards cut away and used as cullet, and a lower portion 13 in which the lower portion of the blank, which eventually forms the footed base for the receptacle, is initially allowed to expand in hollow form. The portions 11 and 12 of the cavity are given any desired practicable configuration according to the desired form and proportion of the glass article to be produced. It will be understood that all portions of this mold cavity are circular in horizontal cross section, that is are symmetrical about the central vertical axis of the mold, so that the glass blank may be rotated about the central vertical axis in the usual manner. The lower cavity 13 comprises an upper outwardly and downwardly projecting portion 14 which gives form to the upper surface of the supporting foot or flange 2 of the receptacle (see Fig. 1), and a cylindrical portion 15 which projects downwardly from the outer edges of the portion 14.

The lower end of each semi-cylindrical mold section 6 and 7 is partially closed by a bottom plate 16 secured to a semi-annular member 17, and a selected number of semi-annular shims 18 may be positioned between member 17 and the lower end of the mold section to adjust the height or length of the cavity 13. The members 16, 17 and 18 may be rigidly secured together and to the mold section by screws 19 or other suitable means. One of the bottom plates 16 (in the example here shown the one attached to the mold section 6) is formed with a downwardly projecting central hub portion 20 which guides and supports the inner movable bottom member or plunger assembly indicated generally at C. The bottom plate 16 attached to the other mold section 7 is centrally recessed to fit about this hub 20 when the mold is closed so that the two plates 16 and the hub 20 form a continuous closure for the lower end of the mold.

The stem or plunger 21 which supports and actuates the movable bottom member C is centered about the central vertical axis of the mold and is guided for vertical movement within passage 22 formed in hub 20. The effective length of the downwardly projecting portion of stem 21 is adjusted as desired by means of screw-bolt 23 screwed into the lower end of stem 21 and held in adjusted position by lock nut 24. Means, hereinafter described, is provided for engaging the lower face of head 25 of screw bolt 23 for automatically giving the desired upward movements to stem 21 in properly timed relation to the blowing operations performed through spindle 4.

The upper movable plunger assembly or bottom member C comprises a central plunger head 26 fixedly mounted on the upper end of stem 21 and a plurality of concentric annular members 27, 28 and 29 which are telescopically assembled about one another and about the plunger head 26 so that the upper surfaces of these members will all lie in substantially the same horizontal plane when the member C is in lowered position as shown in Fig. 4. The annular member 27 comprises an upper head portion 30 and a downwardly extending sleeve portion 31 of reduced external diameter, this sleeve 31 fitting slidably about the plunger head 26. A plurality of compression springs 32 are housed in recesses or slots 33 formed in sleeve 31, these springs bearing at their upper ends against the head portion 30 of member 27 and bearing at their lower ends on an outwardly projecting flange 34 formed at the lower end of plunger 26. A sleeve 35, having the same exterior diameter as the head 30, is threaded onto sleeve 31 and is provided with a lower inwardly projecting annular flange 36 engaging beneath the flange 34 to limit the expansion of springs 32. The springs 32 are under initial compression so as to hold the flanges 34 and 36 in engagement, with the upper surface of head 30 in horizontal alignment with the upper surface of plunger head 26. It will be noted that with the parts in this normal position the sleeve 31 does not extend downwardly into engagement with flange 34 of the plunger member so that when the upward movement of annular member 27 is retarded or limited the plunger head 26 may continue to move upwardly thus compressing the springs 32. The sleeve member 35 is also provided with an outwardly extending bottom flange 37 which corresponds in function to the flange 34 on plunger head 26. The annular assembly indicated at 28 corresponds in all respects to the assembly 27 that has been hereinabove described, a group of springs 38 corresponding to the springs 32 being interposed between the members 27 and 28. The outer annular assembly 29 is also similar to the assemblies 27 and 28 except for the fact that the sleeve member 39 of member 29 is not provided with any outwardly projecting flange and fits slidably within the recess or cavity 13 in the mold sections. The group of springs 40 is interposed between members 28 and 29. It will be understood that any suitable number of springs 32, 38 or 40 may be used, in the example here shown there being three springs in each of these groups positioned 120° apart.

Before specifically describing the mechanism for elevating and lowering stem 21 (to raise and lower the plunger assembly C) the successive steps in the formation of the tumbler by means of this glass forming assembly will first be set forth, these steps being illustrated successively in Figs. 2, 4, 5 and 6. After the mold sections 6 and 7 have been closed about the previously formed blank D, as shown in Fig. 2, the blowing mechanism operates through spindle 4 to admit air under pressure to the interior of the blank so as to expand the blank into the general form indicated in Fig. 4. At this time the portion of the glass blank above the dotted line a—a in Fig. 4 has attained substantially its final form. The portion of the blank between the dotted line a—a and the upper dotted line b—b comprises the side walls of the finished receptacle. After the forming process herein disclosed is completed and the glass article has been removed from the mold, the upper portion of the blank is cut off substantially on the line b—b and all of the glass above this line is scrapped and used as cullet. The portion of the molten glass blank below the line a—a expands into the cylindrical cavity 13 above the lowered plunger assembly C substantially as shown in Fig. 4, so as to form a lower hollow extension comprising cylindrical side walls 41 and a substantially horizontal bottom wall 42. The lower outer edge portion of this hollow extension will not expand tightly into the lower outer edge of the mold cavity but will remain somewhat rounded as indicated at 43.

Immediately following this initial blowing step of the process, and while the glass of the blank is still in an approximately molten condition, the plunger assembly C is elevated rather slowly and steadily by means of the cam mechanism hereinafter described. It will be understood that during this elevation of the plunger, air under pressure is still maintained within the blank, and the spindle 4 continues to spin or oscillate the blank within the mold. As the plunger C rises, the molten glass forming the side walls 41 will be compressed (but not folded) the excess glass flowing inwardly so as to thicken the side walls 41 and the adjacent portion of bottom wall 42. During the initial portion of this operation and until considerable resistance has been encountered due to the compression of the lower portion of the glass blank, the plunger assembly C will move upwardly as a unit, the upper surfaces of the components 26, 27, 28 and 29 of member C remaining substantially in the same horizontal plane. When the outer annular member 29 has reached substantially its maximum elevation and the outer portion of foot 2 of the glass article has attained substantially its final form, the upward movement of member 29 will be retarded or halted and the inner members of the plunger assembly will continue to move upwardly compressing the outer group of springs 40. This intermediate step in the operation is indicated in Fig. 5. It will be noted that the upper outer edges of the plunger members 26, 27 and 28 are cut away or beveled as indicated at 44 so as not to form sharply defined edges in the lower portion of the foot 2 of the tumbler. The molten glass will drape itself over these plunger members as they are successively elevated one within the other so as to form a series of rounded or fluted surfaces in the lower concave portion of the foot substantially as shown in Fig. 1. There will therefore be no sharp edges in the lower portion of the tumbler and the fluted surfaces will impart an attractive ornamental appearance to the foot when viewed through the transparent glass walls.

In a similar manner the annular member 27 will be elevated beyond the member 28, and the plunger head 26 will eventually be elevated above the annular member 27 until the plunger assembly has reached its upper limit of movement as indicated in Fig. 6. It will be understood that air pressure is constantly being applied to the inner surface of the blank so that this inner surface will be rounded out as indicated in Fig. 6 to form a smooth lower surface to the cavity within the tumbler or other receptacle. It will be noted that the molten glass forming this lower portion of the blank is reformed by this progressive pressing operation, rather than folded and welded, and there are no evidences of a weld in the finished glass article to indicate the initial hollow form of this portion of the glass article.

In order to obtain the best results, it is of course essential that the proper pressures (both air and plunger pressure) be applied, and that the successive operations be properly timed. The application of the air pressure is controlled through the spindle 4 in the usual manner. The mechanism for automatically operating the plunger assembly C in properly timed relation to the spindle operations will now be described. In one type of glass-working machine, for example a machine such as is disclosed and claimed in my copending application Serial No. 621,854, filed July 11, 1932, the mold assemblies are stationary while this blowing and pressing process is being carried out, that is these mold assemblies are not traveling bodily but are for the time being in a fixed position relative to the remainder of the machine. In order to operate the plunger mechanisms in a machine of this type, apparatus of the form shown in Figs. 4, 5, 8 and 9 may be used. A vertically movable rod or plunger 45 is supported for vertical sliding movement in a frame 46 mounted on the member 47 which may be a portion of the frame of the glass-working machine. A horizontally disposed yoke 48 is adjustably mounted on the upper threaded end portion 49 of plunger 45 by means of the nuts 50. The side arms 51 of this yoke project in such a direction that their enlarged ends 52 are centered respectively beneath the two operating stems 21 of the pair of mold assemblies D and E. In each enlarged head member 52 is mounted a socket member 53 which houses and guides a vertically movable plunger 54 adapted to engage the adjustable head 25 at the lower end of operating stem 21. The plunger 54 is normally held in its upper position by means of a spring 55 confined between the plunger and a centering and adjusting screw 56 mounted in the lower portion of head 52. This assembly forms an equalizing device whereby the pressures applied to the two stems 21 may be properly equalized, and the springs 55 will yield to prevent any excessive upward pressure being imparted to either or both of the mold mechanisms. The springs 55 also serve as a means for relieving the maximum upward pressure applied to the plunger assembly C, as hereinafter described.

A bellcrank 57 is pivoted on a horizontal axis 58 in a housing 59 formed in the lower portion of guide frame 46, the upper arm of the bellcrank being connected by a short link 60 with the lower end of plunger 45. At 61 is indicated a vertical shaft which is constantly rotated in properly timed relation to the mechanism which controls the spindle and mold operating devices. In a disk 62 keyed on this shaft is mounted a cam 63. A lever 64 pivoted intermediately on the vertical axis 65 carries at one end a roller 66 which bears against the cam 63. The other arm of lever 64 is connected by means of link 67 with the downwardly projecting arm of bellcrank 57. It will now be apparent that as the raised portions of cam 63 engage the roller 66, the lever and link mechanisms hereinabove described will operate to lift the plunger 45, thereby elevating the yoke 48 and plungers 54 and giving the desired upward movements to the two stems 21 and the plunger assemblies C in the mold mechanisms. The cam 63, which may be built up in sections, has a first section 68 formed with a rise sufficient to lift the plunger assembly C from the position shown in Fig. 4 to the position shown in Fig. 6, and also materially compress the spring 55. The short intermediate section of the cam indicated at 69 is adapted to lower the head 52 so as to permit spring 55 to expand without materally lowering the plunger assembly C. This will relieve the maximum pressure applied to the lower end of the glass blank. The section 70 of the cam is of substantially uniform height and is adapted to maintain the plunger assembly in its raised position but with the pressure relieved by the expansion of springs 55. The lower portion 71 of the cam permits the plunger assembly C to be lowered to substantially the position shown in Fig. 4. The speed of rotation of shaft 61 and the relative length of the different cam sections will be properly proportioned for the different time intervals required for the tumbler-forming operation. For example, it has been found that for the production of one type of tumbler the time required for one complete operation should be about thirteen seconds. During the first three seconds the glass blank is blown from the form shown in Fig. 2 to the expanded form shown in Fig. 4. This takes place while the plunger assembly C is in its lowered position and before the roller 66 runs onto the cam section 68. During the next five seconds the roller 66 is in engagement with cam section 68 and the plunger assembly C is being elevated slowly until the maximum pressure is applied with the parts in the position shown in Fig. 6. The section 69 of the cam is made as short as practicable so as to very quickly release the maximum pressure by permitting springs 55 to expand, while still holding the plunger assembly C substantially in the position shown in Fig. 6. The section 70 of the cam may be of a length similar to that of section 68 so that the relative positions of the parts will be maintained substantially as shown in Fig. 6 for another five seconds during which time the blowing and spinning of the blank is continued. The reason for releasing the maximum pressure is to prevent twisting of the tumbler since the glass blank is rotating or oscillating in the mold almost continuously during this entire forming process. After the roller 66 runs off of cam section 70 onto the lower portion 71 of the cam, so as to lower the plunger assembly C, the mold sections are separated and the finished glass article removed in the usual manner. It will be understood that the timing as here given is merely illustrative and that it will vary in accordance with chnges in the sizes and proportions of the glass article, changes in the pressures used, and changes in the temperature and character of the glass.

In another well known type of glass-working machine, the mold assembles D and E will revolve continuously and at a substantially uniform speed throughout a circular path of travel, the different glass-working operations taking place at successive and definite locations along this circular path. In this form of machine, a roller 73 is mounted in the lower end of the operating stem 21' of each mold assembly, this roller traveling upon the upper surface of a fixed arcuate cam indicated at 74 (see Fig. 10). This cam 74 (which may be built up in sections) will have a series of sections or risers corresponding to the parts 68, 69, 70 and 71 of the cam 63 already described, the lengths of these sections being properly proportioned to the rate of travel of the mold assembly through its arcuate path. The operation of the plunger assembly will be the same as already described in connection with the first form of the invention. The operating stem 21' may be made of telescoping sections with an interposed compression spring 75 which is compressed when the plunger assembly is elevated to its maximum height, but which is subsequently permitted to expand to relieve the maximum pressure as already described in connection with the springs 55.

I claim:

1. Apparatus for forming footed hollow glassware comprising means for supporting a blank of molten glass and directing air under pressure internally of the blank to expand the blank, a mold for confining the expanding blank to give a predetermined final conformation to the upper portion of the blank and a preliminary hollow conformation to the lower portion of the blank, and means for forcing the lower hollow portion of the blank upwardly in opposition to the internal air pressure to reform this portion as a bottom for the upper hollow portion and as an integral downwardly dished supporting foot portion, the latter means comprising a plurality of relatively movable members for successively lifting the bottom portion of the glass blank to different elevations increasing progressively from the outer edges of the blank toward the central portion thereof.

2. Apparatus for forming footed hollow glassware comprising means for supporting a blank of molten glass and directing air under pressure internally of the blank to expand the blank, a mold for confining the expanding blank to give a predetermined final conformation to the upper portion of the blank and a preliminary hollow conformation to the lower portion of the blank, and means for forcing the lower hollow portion of the blank upwardly in opposition to the internal air pressure to reform this portion as a bottom for the upper hollow portion and as an integral downwardly dished supporting foot portion, the latter means comprising a plunger movable vertically within the lower portion of the mold, the plunger comprising a plurality of concentric annular portions relatively movable to different individual positions within the mold.

3. Apparatus for forming footed hollow glassware comprising means for supporting a blank of molten glass and directing air under pressure internally of the blank to expand the blank, a mold for confining the expanding blank to give a predetermined final conformation to the upper portion of the blank and a preliminary hollow conformation to the lower portion of the blank, and means for forcing the lower hollow portion of the blank upwardly in opposition to the internal air pressure to reform this portion as a bottom for the upper hollow portion and as an integral downwardly dished supporting foot portion, the latter means comprising a plunger movable vertically within the lower portion of the mold, the plunger comprising a plurality of concentric annular portions telescopically assembled, and springs interposed between the portions to permit independent movement of the portions against the resistance of the springs.

4. Apparatus for forming footed hollow glassware comprising means for supporting a blank of molten glass and directing air under pressure internally of the blank to expand the blank, a mold for confining the expanding blank to give a predetermined final conformation to the upper portion of the blank and a preliminary hollow conformation to the lower portion of the blank, and means for forcing the lower hollow portion of the blank upwardly in opposition to the internal air pressure to reform this portion as a bottom for the upper hollow portion and as an integral downwardly dished supporting foot portion, the latter means comprising a plunger movable vertically within the lower portion of the mold, the plunger comprising a plurality of relatively movable concentric portions, and springs interposed between the portions, the springs functioning to maintain a predetermined relative positioning of the portions during the vertical movement of the plunger but yielding to permit relative movement of the portions when unequal resistance is encountered by the individual portions.

5. Apparatus for forming footed hollow glassware comprising means for supporting a blank of molten glass and directing air under pressure internally of the blank to expand the blank, a mold for confining the expanding blank to give a predetermined final conformation to the upper portion of the blank and a preliminary hollow conformation to the lower portion of the blank, and means for forcing the lower hollow portion of the blank upwardly in opposition to the internal air pressure to reform this portion as a bottom for the upper hollow portion and as an integral downwardly dished supporting foot portion, the latter means comprising a plunger movable vertically within the lower portion of the mold, the plunger comprising a plurality of relatively movable concentric portions, and springs interposed between the portions, the springs functioning to maintain a predetermined relative positioning of the portions during the vertical movement of the plunger but yielding to permit each successive inner portion to move upwardly in advance of the adjacent outer portion as the progress of the outer portions is successively retarded by the resistance of the compressed blank.

6. Apparatus for forming footed hollow glassware comprising a split mold formed with a cavity for giving form to the upper hollow portion of the article, means for suspending a molten glass blank within the mold and applying controlled air pressure internally of the blank to expand it within the mold, the lower portion of the mold cavity being extended downwardly to permit the lower portion of the blank to expand in hollow form beyond the desired final conformation of the glass article, a bottom member movable vertically in this lower cavity to compress the hollow lower portion of the blank in opposition to the internal air pressure and reform this portion of the blank as a bottom for the upper hollow portion and a downwardly dished supporting foot, and means for moving the bottom member upwardly in timed relation to the application of the internal air pressure, the bottom member comprising inner and outer portions which are relatively movable to permit additional upward movement of the inner portions after the upward movement of the outer portions has been limited by the compression of the glass blank.

7. Apparatus for forming footed hollow glassware comprising a split mold formed with a cavity for giving form to the upper hollow portion of the article, means for suspending a molten glass blank within the mold and applying controlled air pressure internally of the blank to expand it within the mold, the lower portion of the mold cavity being extended downwardly to permit the lower portion of the blank to expand in hollow form beyond the desired final conformation of the glass article, a bottom member movable vertically in this lower cavity to compress the hollow lower portion of the blank in opposition to the internal air pressure and reform this portion of the blank as a bottom for the upper hollow portion and a downwardly dished supporting foot, means for moving the bottom member upwardly in timed relation to the application of the internal air pressure, the bottom member comprising inner and outer portions which are relatively movable to permit additional upward movement of the inner portions after the upward movement of the outer portions has been limited by the compression of the glass blank, and spring means to normally hold the inner and outer portions in predetermined relative positions.

8. Apparatus for forming footed hollow glassware comprising a split mold formed with a cavity for giving form to the upper hollow portion of the article, means for suspending a molten glass blank within the mold and applying controlled air pressure internally of the blank to expand it within the mold, the lower portion of the mold cavity being extended downwardly to permit the lower portion of the blank to expand in hollow form beyond the desired final conformation of the glass article, a bottom member movable vertically in this lower cavity to compress the hollow lower portion of the blank in opposition to the internal air pressure and reform this portion of the blank as a bottom for the upper hollow portion and a downwardly dished supporting foot, and means for moving the bottom member upwardly in timed relation to the application of the internal air pressure, the bottom member comprising a central plunger, a plurality of telescopically assembled concentric annular portions, and spring means interposed between adjacent portions of the bottom member and tending to normally hold the portions in predetermined relative positions when the bottom member is lowered and during the initial portion of the upward movement of the bottom member, the spring means permitting inner portions of the bottom member to move upwardly relative to the adjacent outer portions as the blank is compressed.

9. Apparatus for forming footed hollow glassware comprising a split mold formed with a cavity for giving form to the upper hollow portion of the article, means for suspending a molten glass blank within the mold and applying controlled air pressure internally of the blank to expand it within the mold, the lower portion of the mold cavity being extended downwardly to permit the lower portion of the blank to expand in hollow form beyond the desired final conformation of the glass article, a bottom member movable vertically in this lower cavity to compress the hollow lower portion of the blank in opposition to the internal air pressure and reform this portion of the blank as a bottom for the upper hollow portion and a downwardly dished supporting foot, and cam-actuated means for moving the bottom member upwardly in timed relation to the application of the internal air pressure, the bottom member comprising a central plunger, a plurality of telescopically assembled concentric annular portions, and spring means interposed between adjacent portions of the bottom member and tending to normally hold the portions in predetermined relative positions when the bottom member is lowered and during the initial portion of the upward movement of the bottom member, the spring means permitting inner portions of the bottom member to move upwardly relative to the adjacent outer portions as the blank is compressed.

10. The method of making footed glassware consisting in expanding a blank of molten glass by applying controlled internal air pressure, confining the upper portions of the expanding blank to give the desired conformation thereto while permitting the lower portion of the blank to expand beyond the desired final form, and then, while the blank remains in molten condition, reforming the lower initially hollow portion by external pressure applied upwardly in opposition to the internal air pressure, this external pressure being so applied as to lift the inner portions of the bottom of the blank to successively increased heights relative to the next adjacent outer portions, whereby the lower portion of the blank is reformed as a downwardly dished supporting rim integral with the bottom of the hollow article.

11. The method of making footed glassware consisting in expanding a blank of molten glass by applying controlled internal air pressure, confining the upper portions of the expanding blank to give the desired conformation thereto while permitting the lower portion of the blank to expand beyond the desired final form, and then, while the blank remains in molten condition, reforming the lower initially hollow portion by external pressure applied upwardly in opposition to the internal air pressure, this external pressure being so applied as to first lift the bottom wall of the lower over-expanded portion upwardly as a unit, and then progressively lift concentric portions of the bottom of decreasing diameter to sucsessively greater elevations, whereby the lower portion of the blank is reformed as a downwardly dished supporting rim integral with the bottom of the hollow article.

HAROLD R. SCHUTZ.